UNITED STATES PATENT OFFICE.

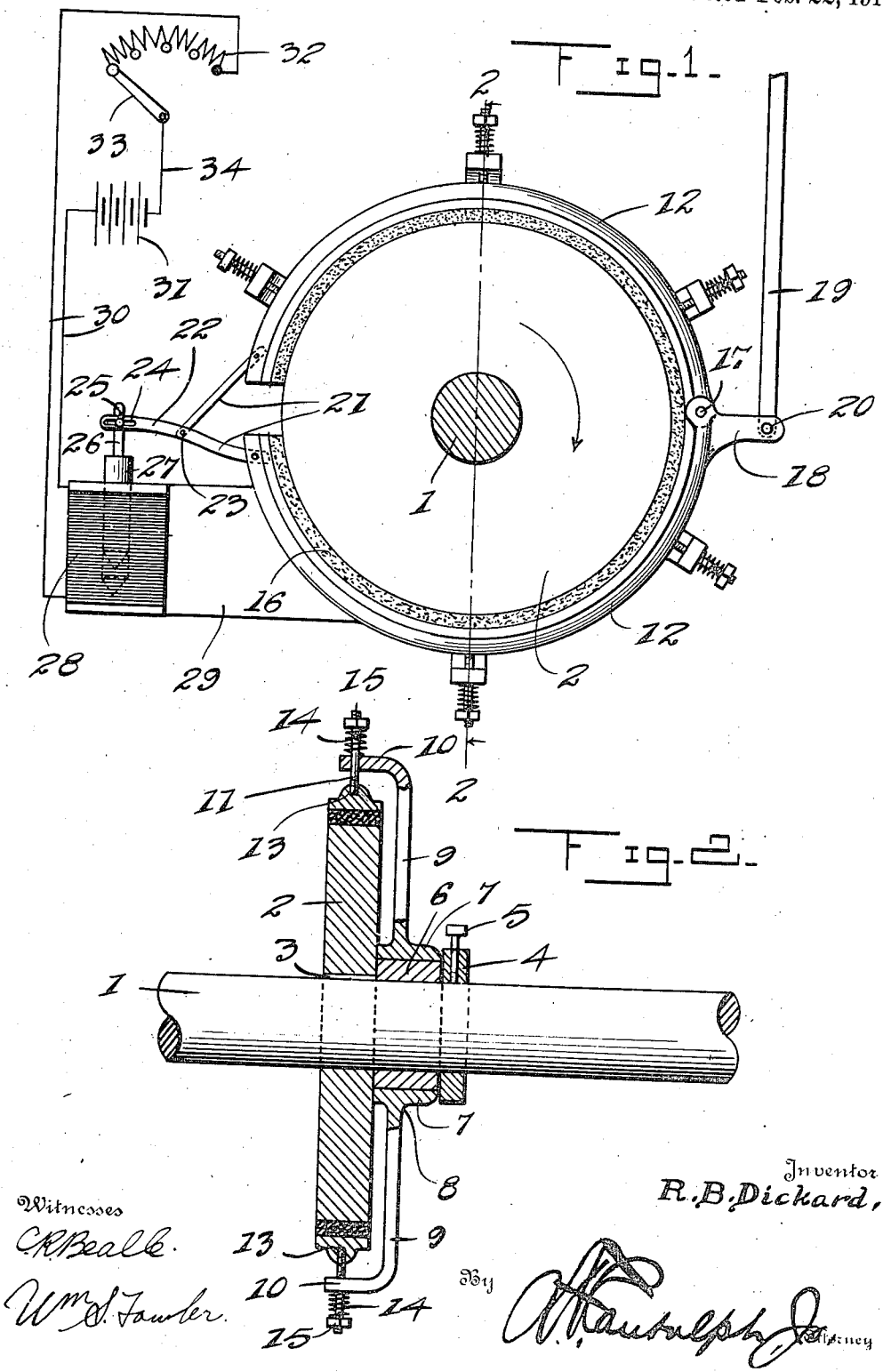

REGAN B. DICKARD, OF AUSTIN, TEXAS.

BRAKE-APPLYING MECHANISM.

1,172,956.  Specification of Letters Patent.  Patented Feb. 22, 1916.

Application filed October 9, 1914. Serial No. 865,969.

*To all whom it may concern:*

Be it known that I, REGAN B. DICKARD, a citizen of United States, residing at Austin, in the county of Travis and State of Texas, have invented certain new and useful Improvements in Brake-Applying Mechanism; and I do hereby declare the following to be a full, clear, and exact description of the invention, such as will enable others skilled in the art to which it appertains to make and use the same.

This invention comprehends certain new and useful improvements in brake applying mechanisms and has for its primary object to provide improved and novel mechanism mounted upon a rotary member of a vehicle and connected with the brakes to carry the same automatically.

The invention has for another object to provide a mechanism of this character which may be controlled by electricity or air or any other suitable means and will be extremely simple as well as active in operation and will utilize the rotary movement of a shaft or other rotary member of the vehicle and the power by which the brakes are applied.

The invention has for a still further object to generally improve and simplify the construction and operation of a brake applying mechanism of this character and increase the efficiency thereof without materially increasing the cost thereof and also construct and arrange the parts in such manner that they may be readily incorporated in vehicles of various characters without altering the construction and operation of the parts of the vehicle, the mechanism being adapted for applying brakes of various types.

With the above and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing in which, Figure 1 is a diagrammatic view of the complete device with a shaft of the vehicle upon which some of the parts of the mechanism are mounted, shown in section, and Fig. 2 is a transverse detail section on the plane of line 2—2 of Fig. 1.

Referring more particularly to the drawing in which similar reference characters designate corresponding parts throughout the several views, 1 designates a shaft or other rotary member of a vehicle, on which is keyed a disk 2, as shown at 3 for rotation with the shaft 1.

Loosely mounted upon the shaft 1 and held against longitudinal movement thereon in one direction by the disk 2 and in the reverse direction by the adjustable collar 4 secured in position upon the shaft 1 by a set screw 5 or other suitable means, is a bearing 6 from which the hub 7 of the supporting wheel or spider 8 is loosely mounted, the arms 9 of the spider being extended radially from the hub 7 and having their free ends 10 directed at right angles to their main portion and extended over the periphery of the disk 2 with pins 11 extended through the turned ends 10 thereof and swiveled to the sections 12 of the sectional brake band as shown at 13.

The sections 12 of the brake band of the brake applying mechanism are resiliently retained in normal position by means of the tension springs 14 engaged around the pins 11 and bearing against the outer faces of the turned ends 10 of the arms 9 and against the tension adjusting nuts 15 threaded upon the outer end of said pins 11 to adjust the tension of the springs 14. The sections 12 of brake band are provided with linings 16 which bear lightly upon the periphery of the disk 2 and the sections 12 are connected at their rear ends by a pivot pin 17, as clearly shown in Fig. 1, while an arm 18 projects outwardly from one of the sections 12 at which the section is connected with the opposite section and has an operating arm 19 pivoted thereto, as shown at 20, the operating arm 19 leading to suitable braking mechanism (not shown), to operate the same and thereby apply the brakes to the vehicle upon which my mechanism is mounted when the brake band sections 12 are clamped upon the periphery of the disk 2 to rotate with the same and the rotating shaft 1, it being understood that the shaft 1 and disk 2 are preferably rotated in the direction indicated by the arrow in Fig. 1.

The free spaced ends of the sections 12 of the brake band are connected by the connecting links 21, one of which is extended as shown at 22 beyond the pin 23 by which the outer ends of the connecting links 21 are pivoted together and this extended end 22 is provided with an elongated slot 24 to which a pivot pin 25 is engaged, said pin 25 being mounted in the reduced extended upper end 26 of the armature 27 which is adapted to be drawn downwardly in the magnet 28 of a solenoid mounted upon the supporting bracket arms 29 projecting outwardly from the free end of the lower section 12 of the brake band. It will be understood that the armature 27 of the solenoid is drawn downwardly in the magnet 28 when the same is energized by electricity flowing through the conducting wires 30, one of which leads directly to one pole of the battery 31 while the other connected wire 30 leads to one point of the rheostat 32, with the various parts of which is adapted to be engaged to the controlling lever 33 which is connected with a conducting wire 34 leading from the opposite pole of the battery 31 to vary the current blowing through the magnet 28 of the solenoid to energize the same and thereby vary the application of the brake through my brake applying mechanism.

It will be evident that when the armature of the solenoid is drawn downwardly in the magnet, the connecting links will be drawn toward one another at their inner ends, thereby drawing together the free spaced ends of the sections 12 of the brake band of my brake applying mechanism to place the same upon the disk 2 and thereby cause the brake band to be rotated with the disk and shaft 1 to move the connecting arms carried by one of the brake band sections 12 in the proper direction to apply the brake, (not shown) of the vehicle to which my brake applying mechanism is applied, the rotary movement of the shaft being utilized to rotate the brake band and apply the brake of the vehicle, thereby causing the brake to be applied slowly or suddenly depending upon the speed at which the shaft 1 is rotated, and the amount of magnetic pull upon the armature of the solenoid.

While the preferred embodiment of the invention has been shown and illustrated, it will be understood that minor changes in the details of construction and arrangement of parts may be made within the scope of the appended claims without departing from the spirit of the invention or sacrificing any of the advantages thereof.

What is claimed is:—

1. The combination with a brake operating rod and a rotary shaft, a disk mounted upon said shaft, sectional brake band engaged around the periphery of said disk, a collar rigidly secured to said shaft on one side of said disk, a hub bearing disposed between said collar and disk and being loosely mounted upon said shaft, a plurality of arms radiating from said hub their outer ends bent inwardly, means through the outer ends of said arms for adjustably holding the sectional brake band to the periphery of the disk, and means carried by one end of said sectional band for hingedly securing them together, their opposite ends being connected by links for operating the same, and means at the hinged end of the brake band to connect the same to the operating rod.

2. The combination with a brake operating rod and a rotary shaft, a disk mounted upon said shaft, a sectional brake band mounted around the periphery of said disk, a collar adjustably secured to said shaft, a bearing hub positioned between said collar and disk, a plurality of arms radiating from said hub having their outer ends bent inwardly, means carried by said arms for adjustably holding the brake sections upon the disk, one end of the section being hingedly connected and having a projection extending therefrom, said projection connected to the operating rod, the opposite end of said section being connected by links, and electrically operated means connected to said links, providing means for drawing together the sections of the brake band and clamp the same upon the disk for rotation with said disk and shaft to move the brake operating arm in one direction.

In testimony whereof I affix my signature in presence of two witnesses.

REGAN B. DICKARD.

Witnesses:
FRANK K. FISHER,
R. S. MALLETT.